C. C. KUSTERER.
CONVERTIBLE VEHICLE.
APPLICATION FILED JULY 16, 1919.
1,358,001.
Patented Nov. 9, 1920.
2 SHEETS—SHEET 2.
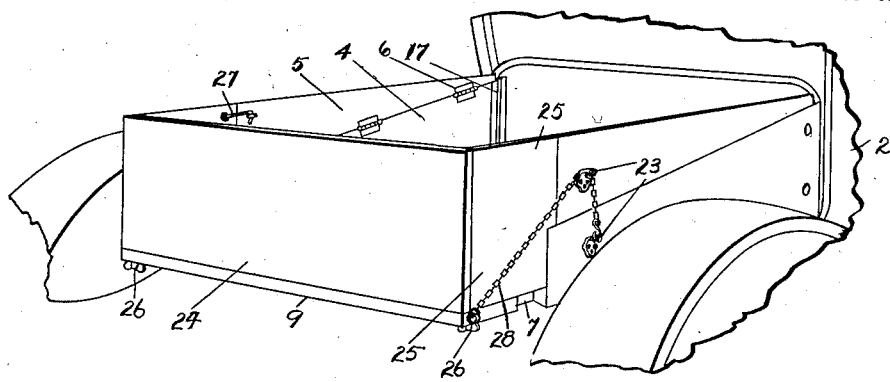
Fig. VI.
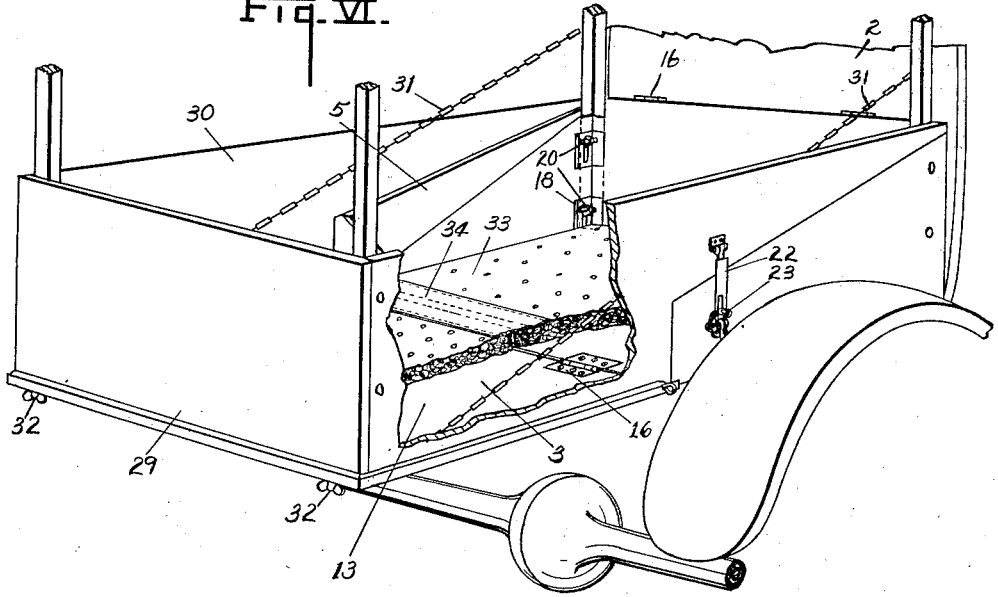
Fig. VII.
Witnesses
Penn Gilman
Fred Ullrich
Inventor
Carl C. Kusterer
By Chappell & Earl
Attorneys

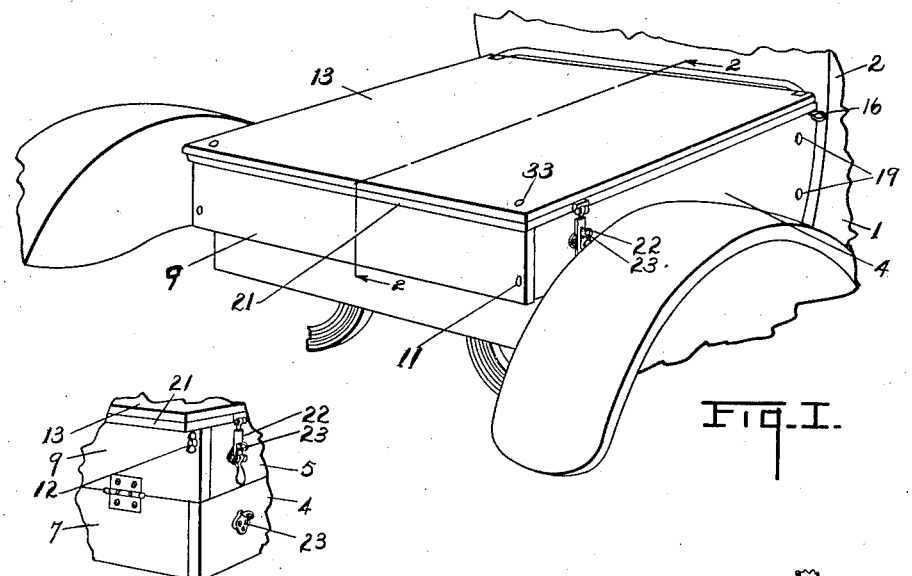
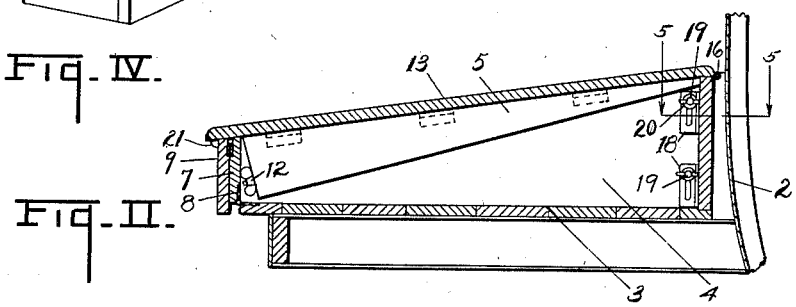
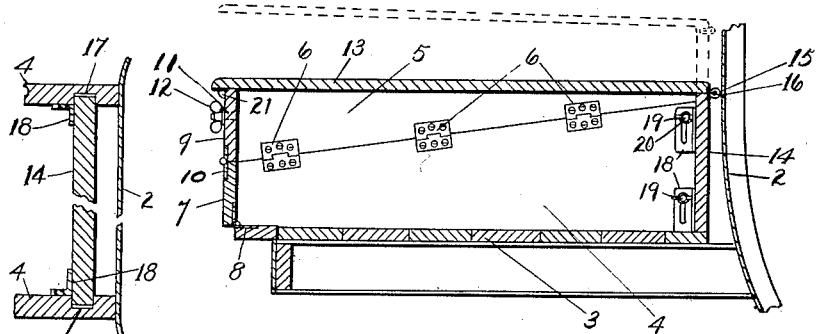

UNITED STATES PATENT OFFICE.

CARL C. KUSTERER, OF GRAND RAPIDS, MICHIGAN.

CONVERTIBLE VEHICLE.

1,358,001.   Specification of Letters Patent.   Patented Nov. 9, 1920.

Application filed July 16, 1919. Serial No. 311,334.

*To whom it may concern:*

Be it known that I, CARL C. KUSTERER, a citizen of the United States, residing at the city of Grand Rapids, county of Kent, State of Michigan, have invented certain new and useful Improvements in Convertible Vehicles, of which the following is a specification.

This invention relates to improvements in convertible vehicles.

The main objects of this invention are,

First, to provide an improved convertible vehicle adapted to be adjusted as a truck or as a pleasure vehicle of the runabout "turtle back" type, Second, to provide an improved convertible vehicle having these advantages which when adjusted as a pleasure vehicle maintains the general outlines of a runabout, Third, to provide an improved convertible vehicle which may be quickly changed from one adaptation to the other and, by the addition of certain parts, its capacity increased.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail perspective of my improved convertible vehicle adjusted as a pleasure vehicle or runabout.

Fig. II is a detail vertical section on a line corresponding to line 2—2 of Fig. I.

Fig. III is a detail vertical section corresponding to that of Fig. II of my improved vehicle adjusted to increase its carrying capacity.

Fig. IV is a detail rear perspective of the vehicle adjusted as in Fig. III.

Fig. V is a horizontal section on a line corresponding to line 5—5 of Fig. II.

Fig. VI is a detail rear perspective showing my improved vehicle adjusted to provide an open body truck.

Fig. VII is a detail rear perspective showing another adjustment or adaptation providing an open body truck of larger capacity than is shown in Fig. VI.

In the drawing similar reference characters refer to similar parts throughout the several views, and the sectional views are taken looking in the direction of the little arrows at the ends of the section lines.

Referring to the drawing 1 represents the body of a motor vehicle comprising a seat 2, a portion only of which is shown and a deck or platform 3 at the rear of the seat. On this deck or platform I mount the relatively fixed lower side members 4. These side members are rearwardly tapered, that is, their upper edges are rearwardly inclined. The upper side members 5 are pivotally mounted on the side members 4 at 6 so as to be erected to form extensions thereof or collapsed against their inner sides, (see Figs. II and III). These side members 5 are forwardly tapered so that they complement the lower side members.

I provide an end or tail board consisting of lower end member 7 pivoted to the rear end of the deck 3 at 8 and an upper end member 9 pivoted to the lower end member at 10 to collapse against the outer side thereof, as shown in Figs. I and II. The side members 5 have bolts or threaded dowels which project through the holes 11 in the upper end member 9 when the end and side members are erected, parts being retained by the winged nuts 12, thus holding both the side members and the end members in their erected position.

The top 13 is pivotally and detachably mounted on the front member 14, the front member and top being provided with coacting hinge members 15, the pintle rod 16 of which is removable. The front member 14 is engaged in vertical grooves 17 on the inner sides of the side members 4 at the front ends thereof. (See Fig. V.) The front member 14 has brackets or attaching plates 18 engaged by the bolts 19 having winged nuts 20 on their inner sides. When the side members 5 and the end member 9 are collapsed, the top 13 is adapted to rest on the upper edges of the side members 4 and end member 7, the top then being rearwardly inclined, the vehicle having the general appearance of a roadster.

To increase the capacity of the vehicle, the sides 5 and end member 9 are erected, when the top is then supported in a horizontal position, the body then being rectangular as shown in Figs. III and IV. The top has moldings 21 which embrace the sides as shown. To hold the top in its closed position, I provide latches 22. The side members 4 and 5 are each provided with coacting keepers 23 with either of which the latches may be engaged. These are preferably of the type used to secure the hoods of motor vehicles as the parts are held under tension.

In the adaptation shown in Fig. VI, the top 13 and front member 14 are removed and the end or tail board adjusted as an extension for the deck 3. The auxiliary end 24 with the side extensions 25 are arranged on this deck extension and are provided with bolts 26 arranged through the holes 11 in the member 9. On the upper side members 5 eyes are provided to receive hooks 27 to further secure the parts. The bottom extension is supported by the chain 28 engaged over the keepers 23.

In the adaptation shown in Fig. VII, the top 13 is removed from the front member 14, the end member or tail board removed and the top member secured to provide a bottom extension. The auxiliary end 29 is provided and the auxiliary sides 30 are arranged to provide extensions for the side members 4. Chains 31 are connected to the rear end of the bottom extension to support the same. The sides 30 are provided with latches 22 engaging with the keepers 23 on the side members 4. Bolts 32 on the end member 29 are arranged through holes 33 in the top.

The embodiment shown in Fig. VII is adapted to receive the mattress as 33 having a hinge at 34, so that it may be folded and inclosed in the body when adjusted to the form shown in Fig. I. This renders the vehicle well adapted for use of campers and the like. Posts are provided at the corners for supporting a cover or canopy.

With this arrangement of parts, I am able to provide a vehicle of four different carrying capacities, the different capacities being attained by changing or adding few parts.

I have not attempted to illustrate or describe certain other modifications and adaptations which I contemplate, as I believe the disclosure made will enable those skilled in the art to which my invention relates to adapt or embody the same as the particular vehicle in which they are embodied may render most desirable.

Having thus described my invention, what I claim as new and desire to secure by Letters Patent, is:

1. In a convertible vehicle, the combination of a body comprising a seat and a deck at the rear thereof, rearwardly tapered lower side members having vertical grooves on their inner sides at the forward ends thereof, complementary forwardly tapered upper side members pivoted upon said lower side members to constitute extensions thereof or to collapse against the inner sides thereof, said upper side member being provided with end member attaching bolts at their rear ends, an end comprising a lower member pivoted to said deck, and an upper member pivoted to the lower and adapted to be collapsed against the outer side thereof, or said end being adjustable as an extension of said deck, said upper end member being provided with holes adapted to receive said attaching bolts on said upper side members, a top, a front board to which said top is pivotally and detachably secured removably engaged in said grooves of said lower side members and provided with securing brackets, bolts on said lower side members coacting with said brackets, latches on said top, keepers on said upper and lower side members with which said latches may be engaged, and an auxiliary end having side extensions secured thereto, adapted to be removably mounted on said adjustable end when it is adjusted as a deck extension.

2. In a convertible vehicle, the combination of a body comprising a seat and a deck at the rear thereof, rearwardly tapered lower side members having vertical grooves on their inner sides at the forward ends thereof, complementary forwardly tapered upper side members pivoted upon said lower side members to constitute extensions thereof or to collapse against the inner sides thereof, said upper side members being provided with end member attaching bolts at their rear ends, an end comprising a lower member, and an upper member pivoted to the lower and adapted to be collapsed against the outer side thereof, said upper end member being provided with holes adapted to receive said attaching bolts on said upper side members, a top, a front board to which said top is pivotally secured removably engaged in said grooves of said lower side members and provided with securing brackets, bolts on said lower side members coacting with said brackets, latches on said top, keepers on said upper and lower side members with which said latches may be engaged.

3. In a convertible vehicle, the combination of a body comprising a seat and a deck at the rear thereof, rearwardly tapered lower side members having vertical grooves on their inner sides at the forward ends thereof, complementary forwardly tapered upper side members pivoted upon said lower side members to constitute extensions thereof or to collapse against the inner sides thereof, said upper side members being provided with end member attaching bolts at their rear ends, an end comprising a lower member, and an upper member pivoted to the lower and adapted to be collapsed against the outer side thereof, said upper end member being provided with holes adapted to receive said attaching bolts on said upper side members, a top overlapping the said side and end members and provided with moldings to embrace and support the same when the top is closed, a front board to which said top is pivotally secured removably engaged in said grooves of said lower side members and provided with securing brackets, bolts on said lower side members coacting with said brackets, latches on said top, keepers on said upper and lower side members with which said latches may be engaged.

4. In a convertible vehicle, the combination of a body comprising a seat and a deck at the rear thereof, rearwardly tapered lower side members, complementary forwardly tapered upper side members pivoted upon said lower side members to constitute extensions thereof or to collapse against the sides thereof, said pivoted side members being provided with end member attaching means at their rear ends, an end comprising a lower member pivoted to said deck, and an upper member pivoted to the lower to be collapsed, or said end adjusted as an extension of said deck, a top overlapping the said side and end members and provided with moldings to embrace and support the same when the top is closed, a removable front board to which said top is removably and pivotally secured, latches on said top, keepers on said upper and lower side members with which said latches may be engaged, and an auxiliary end having side extensions secured thereto adapted to be removably mounted on said adjustable end when it is adjusted as a deck extension.

5. In a convertible vehicle, the combination of a body comprising a seat and a deck at the rear thereof, rearwardly tapered lower side members, complementary forwardly tapered upper side members pivoted upon said lower side members to constitute extensions thereof or to collapse against the sides thereof, said pivoted side members being provided with end member attaching means at their rear ends, an end comprising a lower member, a top overlapping the said side and end members and provided with moldings to embrace and support the same when the top is closed, a removable front board to which said top is pivotally secured, latches on said top, keepers on said upper and lower side members with which said latches may be engaged.

6. In a convertible vehicle, the combination of a body comprising a seat and a deck at the rear thereof, rearwardly tapered lower side members, complementary forwardly tapered upper side members pivoted upon said lower side members to constitute extensions thereof or to collapse against the sides thereof, an end compri.ing a lower member pivoted to said deck, and an upper member pivoted to the lower to be collapsed, or said end adjusted as an extension of said deck, a top, a removable front board to which said top is removably and pivotally secured, latches on said top, keepers on said upper and lower side members with which said latches may be engaged, and an auxiliary end having side extensions secured thereto adapted to be removably mounted on said adjustable end when it is adjusted as a deck extension.

7. In a convertible vehicle, the combination of a body comprising a seat and a deck at the rear thereof, rearwardly tapered lower side members, complementary forwardly tapered upper side members pivoted upon said lower side members to constitute extensions thereof or to collapse against the sides thereof an end comprising a lower member, a top, a removable front board to which said top is pivotally secured, latches on said top, keepers on said upper and lower side members with which said latches may be engaged.

8. In a convertible vehicle, the combination of a body comprising a seat and a deck at the rear thereof, rearwardly tapered lower side members, complementary forwardly tapered upper side members mounted upon said lower side members to constitute extension thereof when erected or to collapse against their sides, an end comprising a lower member of a width corresponding to the rear ends of the lower side members, and an upper member of a width corresponding to the rear ends of the upper side members, means for securing said upper side and end members in their erected positions, and a top pivoted at its forward end to rest on the upper side and end members when erected or on the lower members when the upper members are collapsed.

9. In a convertible vehicle, the combination of a body comprising a seat and deck at the rear thereof, rearwardly tapered lower side members, complementary forwardly tapered collapsible upper side members, an end comprising a lower member and an upper collapsible member mounted to be adjusted as an end of different widths or as a deck extension, a pivotally and detachably mounted top and an auxiliary end provided with side extensions adapted to be removably mounted on said adjustable end when it is adjusted as a deck extension.

10. In a convertible vehicle, the combination of a body comprising a seat and deck at the rear thereof, rearwardly tapered lower side members, complementary forwardly tapered collapsible upper side members, an end comprising a lower member, and an upper collapsible member mounted to be adjusted as an end of different widths, and a top.

11. In a convertible vehicle, the combination of a body comprising a seat and a deck at the rear thereof, rearwardly tapered lower side members, complementary forwardly tapered upper side members constituting extensions of said lower side members, an end comprising a lower member of a width corresponding to the rear ends of the lower side members, and an upper member of a width corresponding to the rear ends of the upper side members, and a top adapted to rest on the upper members or on the lower members.

12. In a convertible vehicle, the combination of a body comprising a seat and deck at the rear thereof, rearwardly tapered lower side members, a removable end member, a top pivotally and detachably mounted at its forward end and adapted to be removed as a top and secured to the rear end of the deck as a deck extension and an auxiliary end and auxiliary side members constituting extensions for said fixed side members.

13. In a convertible vehicle, the combination of a body comprising a seat and deck at the rear thereof, extensible side and end members comprising lower relatively fixed parts and upper parts hinged thereto to be collapsed or erected as desired and a cover adapted to rest upon the side and end members when they are collapsed or when they are extended thereby providing a box of different capacities.

14. In a convertible vehicle, the combination of a body comprising a seat and deck at the rear thereof, extensible side and end members for said deck and a removable top adapted to be removed as a top and secured to the rear of the deck as a deck extension, all coacting for the purpose specified.

In witness whereof, I have hereunto set my hand and seal in the presence of two witnesses.

CARL C. KUSTERER. [L. S.]

Witnesses:
 WM. E. EDDY,
 H. D. BOUMA.